Nov. 18, 1952 — L. W. FALK — 2,618,135
FLEXIBLE COUPLING
Filed March 2, 1948
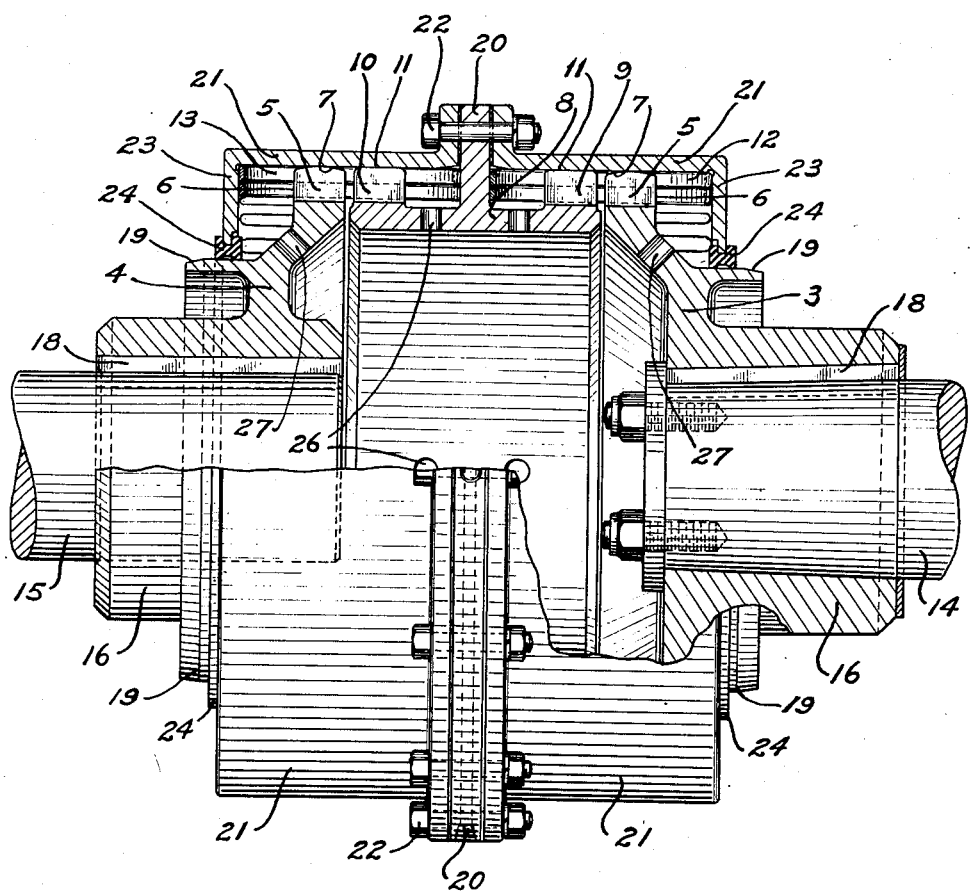
INVENTOR.
LOUIS W. FALK
BY
ATTORNEY.

Patented Nov. 18, 1952

2,618,135

UNITED STATES PATENT OFFICE 2,618,135

FLEXIBLE COUPLING

Louis W. Falk, Milwaukee, Wis., assignor to The Falk Corporation, Milwaukee, Wis., a corporation of Wisconsin Application March 2, 1948, Serial No. 12,609

1 Claim. (Cl. 64—15)

The present invention relates in general to improvements in the construction and operation of flexible couplings for transmitting rotary motion from one member directly to another, and relates more specifically to improvements in shaft couplings of the type shown in U. S. Patent No. 2,027,842, granted January 14, 1936, to Walter P. Schmitter and Percy C. Day.

Many different types of flexible couplings for transmitting rotary motion directly from a driving member or shaft to an approximately alined driven member or shaft, while affording a limited amount of flexibility at the connection between the members, have heretofore been used quite extensively for diverse purposes. For transmission of relatively heavy loads, perhaps one of the most reliable and satisfactory of these prior flexible couplings, is the type shown and described in the above identified patent wherein two adjacent coupling disks are provided with similar sets of peripheral projections or teeth separated by successive normally alined slots with which one or more flexible torque transmitting bands coact so as to permit momentary relative circumferential displacement of the two sets of teeth whenever torque changes occur between the driving and driven members. While this flexible band type of coupling has proven highly successful in commercial use, the degree of flexing afforded by the adjoining toothed elements and the extent of possible misalinement of the shaft axes are limited, and occasion frequently arises for allowing greater relative angular displacement between the approximately coaxial members, and greater relative inclination of the axes of these members, than is possible with the previous couplings.

It is therefore an object of my present invention to provide an improved flexible coupling especially adapted for heavy load transmission, and which will effectively compensate for considerable misalinement of the driving and driven members and for relatively extensive momentary torque load changes.

Another object of this invention is to provide various improvements in the construction of couplings of the type forming the subject of the above mentioned patent, whereby the action of such flexible couplings is improved under certain conditions of operation and usage.

A further object of the present invention is to provide an improved flexible coupling having a rather great range of flexibility both as to torque transmission and relative angularity or off-setting of the axes of the driving and driven members.

Still another object of my invention is to provide a simple, compact, durable, and highly efficient shaft coupling adapted for diverse uses, and which may be readily assembled or dismantled and is capable of being manufactured at moderate cost.

These and other more specific objects and advantages of the present invention will be apparent from the following detailed description.

A clear conception of the several features constituting my present improvement, and of the manner of producing and of utilizing typical couplings embodying the invention, may be had by referring to the drawing accompanying and forming a part of this specification wherein the like reference characters designate the same or similar parts.

The single figure of the drawing is a part sectional side elevation of a typical shaft coupling embodying the present invention, the section having been taken along a plane radiating from the approximately alined axes of the driving and driven members.

While the invention has been shown and described herein as having been embodied in a flexible coupling assemblage interconnecting the adjacent ends of two approximately alined shafts, it is not my desire or intention to unnecessarily limit the utility of the improvement by virtue of the restricted disclosure.

Referring to the drawing, the typical flexible shaft coupling shown therein by way of illustration, comprises in general a pair of approximately axially alined laterally spaced coupling disks 3, 4 each having an annular series of peripheral recesses or slots 5 separated by radial projections 6 provided with arcuate outer end surfaces 7; an annular intervening coupling element 8 disposed between the disks 3, 4 and having two similar annular series of peripheral recesses or slots 9, 10 normally alined with the slots 5 of the adjacent or complementary disks 3, 4 respectively, and being likewise separated by radial projections 11 provided with rectilinear outer end surfaces; an annular set of resilient torque transmitting members 12, 13 slidably and rockably snugly engaging each series of said element slots 9, 10 and the adjacent normally alined disk slots 5; and driving and driven rotary members such as shafts 14, 15 firmly secured to the hubs 16 of the disks 3, 4 respectively in any suitable manner.

Either of the shafts 14, 15 may be the driver, and as shown, the respective shafts 14, 15 are firmly attached to the disks 3, 4 by means of keys 18 and are disposed coaxial relative to their carrying shafts. The two disks 3, 4 may be of similar formation and construction except for proper boring of the hubs 16 to fit the shafts 14, 15, and the axes of these shafts may be somewhat misalined and subject to considerable torque variation during normal operation. As illustrated, the hubs 16 and the teeth or projections 6 are formed integral with their respective disks 3, 4, and each disk is moreover preferably provided with an approximately spherical zone surface 19 surrounding its hub 16 and located outwardly beyond its slots 5 with respect to the coupling assemblage.

The teeth or projections 11 may also be formed integral with the opposite ends of the annular coupling element 8, and the medial portion of this element is provided with an integral rigid outwardly projecting flange 20 extending beyond the projections 11. A pair of similar but reversely disposed cylindrical housing sections or casings 21, is firmly but detachably secured to the flange 20 by means of bolts 22, and each of these casing sections 21 has a cylindrical inner surface snugly embracing the outer surfaces of the adjacent series of projections 11, and is provided with an integral inwardly directed end flange 23 rockably coacting with the integral spherical zone surface 19 of the adjacent disk hub 16 through a pliable sealing ring 24 formed of rubber or the like.

The longitudinal torque transmitting members 12, 13 may be either individual resilient bars, or the successive members of each set may be end connected to form either a single annular grid or one or more grid sections; and as specifically shown, a pair of superimposed inner and outer members 12, 13 coacts with each pair of normally alined complementary slots 5, 9, 10 on opposite sides of the central element flange 20. The elongated bar members 12, 13 may be formed of spring steel or other suitable resilient material, and are confined within the slots 5, 9, 10 by the housing sections 21 which snugly embrace the outer end surfaces of the projections 11, but which rather loosely and rockably coact with the arcuate outer surfaces 7 of the disk projections 6.

The interior of the annular element 8 and of the housing sections 21, may be abundantly supplied with suitable lubricant; and in order to permit this lubricant to constantly reach the normally concealed wearing surfaces, the element 8 may be provided with lubricant circulating openings 26 while the disks 3, 4 may likewise be provided with openings 27. The opposite ends of the element 8 are also spaced slightly from the adjacent ends of the disks 3, 4 for clearance purposes, thus providing additional lubricant passages and insuring proper lubrication of all parts subjected to wear.

During normal operation of the improved flexible coupling assemblage, the disks 3, 4 should be firmly attached to their carrying shafts 14, 15 so as to prevent possible escape of lubricant at the points of attachment, and the interior of the housing sections 21 should also be supplied with an abundance of lubricant. The casing sections 21 should likewise be firmly secured to the element flange 20 so as to prevent lubricant escape, and the sealing rings 24 should be brought into snug coaction with the disk surfaces 19, thereby insuring confinement of the lubricant within the housing. The axes of the shafts 14, 15 and of the disks 3, 4 may be misalined to a considerable extent, and either of these shafts may be utilized to transmit rotary motion through the coupling unit directly to the other.

Assuming the shaft 14 to be the driver, as this shaft revolves, rotary motion is transmitted through the disk 3 to the intervening element 8 and from this element through the disk 4 to the driven shaft 15. If for any reason, a variation in torque as between the shafts 14, 15 occurs, the resilient torque transmitting members 12, 13 will momentarily flex or deflect circumferentially of the element 8 and will thereafter return to normal position while absorbing the torque changes, thus tending to produce uniform torque transmission between the driving and driven shafts 14, 15. Relative angularity or other misalinement of the shaft axes will be compensated for by the arcuate surfaces 7, 19 of the disks 3, 4 which rock upon the adjacent structures, and by the teeth or projections 5 which likewise rock relative to the intervening bar elements 12, 13.

The intervening toothed element 8 not only compensates for relatively extreme torque changes, but this element also compensates for rather pronounced misalinement of the shafts 14, 15 without subjecting the projections 5 and the resilient members to excessive wear, since approximately one-half of the total rocking motion and of the flexing due to torque variation will be absorbed by each set of the flexible members 12, 13. The element 8 may also be made of any desired length to conform with variable distances between the adjacent ends of the shaft 14, 15; and this element 8 and the casing sections 21 are rockably supported by the projections 6. By virtue of the fact that the casing sections 21 and the disks 3, 4 are respectively of interchangeably similar formation, the cost of construction of the coupling may be reduced to a minimum; and access to the normally concealed parts may be readily gained by merely releasing the bolts 22 and by thereafter removing the closure sections 21. The improved coupling may also be quickly and conveniently assembled or dismantled without necessarily disturbing the shafts 14, 15, since the intervening element 8 provides a space sufficient to allow application and removal of the disk hubs 16 relative to the shaft ends; and the various parts may be made sufficiently durable to produce a strong coupling adapted for the transmission of great power for a long period of time without excessive attention.

It should be understood that it is not desired to limit this invention to the exact details of construction or to the precise mode of operation and use, herein shown and described, for various modifications within the scope of the appended claim may occur to persons skilled in the art; and it is also contemplated that specific descriptive terms employed herein be given the broadest possible interpretation consistent with the disclosure.

I claim:

In a flexible coupling the combination of axially spaced driving and driven coupling members each having an annular series of outwardly open slots therein, an intermediate coupling member disposed between said first named members and having two axially spaced annular series of outwardly open slots therein, each of said series of slots being arranged beside the series of slots in one of said first named members, an encircling housing supported by said first named members, means for detachably connecting said intermediate member to said housing for support thereby, a series of resilient elements engaged in said slots in said driving member and in one of said series of slots in said intermediate member to torsionally connect the same independently of said housing, and a second series of resilient elements engaged in said slots in said driven member and in the other of said series of slots in said intermediate member to torsionally connect the same independently of said housing, both of said series of elements being radially confined by said encircling housing, and said housing having separable sections independently movable to expose and permit radial withdrawal of either of said series of elements from the slots in which they are engaged.

LOUIS W. FALK.

REFERENCES CITED

The following references are of record in the file of this patent:

UNITED STATES PATENTS

| Number | Name | Date |
|---|---|---|
| 1,324,523 | Serrell | Dec. 9, 1919 |
| 1,827,176 | Thomas | Oct. 13, 1931 |
| 1,865,330 | McLeod | June 28, 1932 |
| 1,915,399 | Biddy | June 27, 1933 |
| 2,027,842 | Schmitter et al. | Jan. 14, 1936 |
| 2,181,537 | Schmitter | Nov. 28, 1939 |